United States Patent [19]

Abraham

[11] Patent Number: 5,115,645
[45] Date of Patent: May 26, 1992

[54] HEAT EXCHANGER FOR REFRIGERANT RECOVERY SYSTEM

[75] Inventor: Anthony W. Abraham, Arlington, Tex.

[73] Assignee: Wynn's Climate Systems, Inc., Ft. Worth, Tex.

[21] Appl. No.: 621,251

[22] Filed: Nov. 29, 1990

[51] Int. Cl.⁵ .............................................. F25B 45/00
[52] U.S. Cl. ....................................... 62/292; 62/279; 165/140
[58] Field of Search ......................... 62/292, 279, 513; 165/140

[56] References Cited

U.S. PATENT DOCUMENTS

| | | | |
|---|---|---|---|
| 2,188,975 | 2/1940 | Herz | 165/140 |
| 3,154,931 | 11/1964 | Constantini et al. | 62/279 |
| 4,261,178 | 4/1981 | Cain | 62/149 |

FOREIGN PATENT DOCUMENTS 575204 5/1931 Fed. Rep. of Germany ........ 62/279
71937 4/1984 Japan ..................................... 62/279

Primary Examiner—William E. Tapolcai
Attorney, Agent, or Firm—James E. Bradley

[57] ABSTRACT

A refrigerant recovery apparatus has a combination heat exchanger which both serves as a condenser and evaporator. The heat exchanger has spaced apart headers, each header having a plurality of holes. Finned evaporator tubes and finned condenser tubes extend between the headers. The tubes are parallel to each other and perpendicular to the header. A fan blows air through the evaporator. Refrigerant fluid flows through the condenser and evaporator sections of the heat exchanger. The water condensate formed in the evaporator section will evaporate as a result of the heat from the condenser section. In one embodiment, the evaporator tubes are sandwiched between condenser tubes on the forward and rearward sides of the heat exchanger. In another embodiment, the evaporator tubes are located above the condenser tubes.

7 Claims, 3 Drawing Sheets

HEAT EXCHANGER FOR REFRIGERANT RECOVERY SYSTEM

BACKGROUND OF THE INVENTION

1. Field of the Invention

This invention relates in general to an apparatus for recovering refrigerant from an air conditioning system which is to be repaired, and in particular to a heat exchanger for a refrigerant recovery apparatus which both serves as an evaporator and a condenser.

2. Description of the Prior Art

A typical refrigerant recovery apparatus has means for connection to an air conditioning system. The recovery apparatus will draw in the refrigerant from the air conditioning system. The refrigerant flows through an expansion valve, some type of evaporator, a filter and then to a compressor. The compressor compresses the refrigerant and supplies it to a condenser. The condenser condenses the refrigerant to a liquid, which then will be stored in a storage container.

One problem of a refrigerant recovery apparatus is disposing of water condensate that will naturally develop on the tubes of the evaporator coil. The water condensate will drip and requires disposal. Most refrigerant recovery devices are portable and do not have a ready means for disposing of water that collects due to the condensation.

Some refrigerant recovery devices utilize evaporators other than of the finned coil type. One type utilizes an evaporator coil within a cannister. The cannister receives liquid refrigerant warmed by the condenser. The coil is immersed within the liquid refrigerant. Another type utilizes as an evaporator an annular member surrounding the storage container. The stored, warm liquid in the storage container will warm the annular member.

While these types are workable, a finned tube evaporator is efficient and inexpensive. Consequently, it would be desirable to find a ready means for disposal of condensate formed on the tubes of a finned tube evaporator.

SUMMARY OF THE INVENTION

In this invention, the heat exchanger is a combination evaporator and condenser. The heat exchanger preferably has a pair of spaced apart headers with parallel finned tubes extending between them. Some of the tubes will be utilized for the condenser. Others will be utilized for the evaporator. The condensation forming on the evaporator tubes will evaporate as a result of the heat of the condenser tubes.

In one embodiment, the tubes are arranged in vertical rows. The forward row of the heat exchanger and the rearward row of the heat exchanger are connected together to form a part of the condenser. At least two rows between the condenser rows will serve as the evaporator. A fan will cause air to flow through the heat exchanger.

In another embodiment, all of the tubes of the condenser locate below the tubes of the evaporator. The condensate on the evaporator tubes will drip onto the condenser tubes. The heat of the condenser tubes will cause the condensate to evaporate.

DETAILED DESCRIPTION OF THE INVENTION

Figure 1:
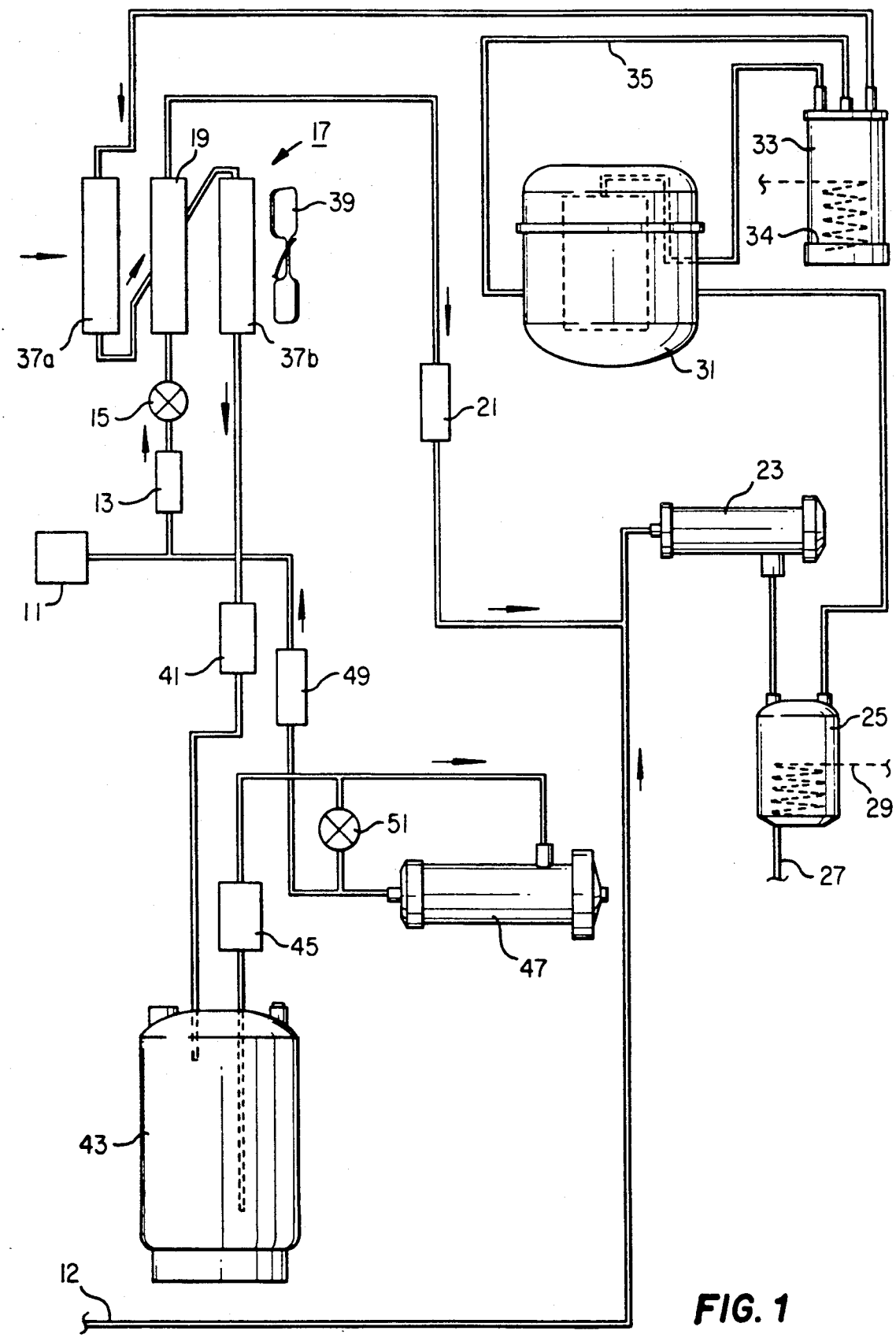
FIG. 1 is a schematic view illustrating a refrigerant recovery apparatus constructed in accordance with this invention.

Referring to FIG. 1, the refrigerant recovery apparatus has a liquid inlet connection 11. Connection 11 is adapted to be connected to an air conditioning system for recovering refrigerant from the system. The refrigerant entering the connection 11 will likely be a mixture of gas and liquid.

The apparatus also has a connection 12 for connecting to a point in the air conditioning system that recovers only gaseous refrigerant from the system. The input connection 11 leads to a filter 13 for removing impurities from the recovered refrigerant. Filter 13 connects to an expansion valve 15. Expansion valve 15 will drop the pressure of the incoming refrigerant, causing it to convert to a gas. When converting to a gas, the temperature of the refrigerant will drop.

Figure 2:
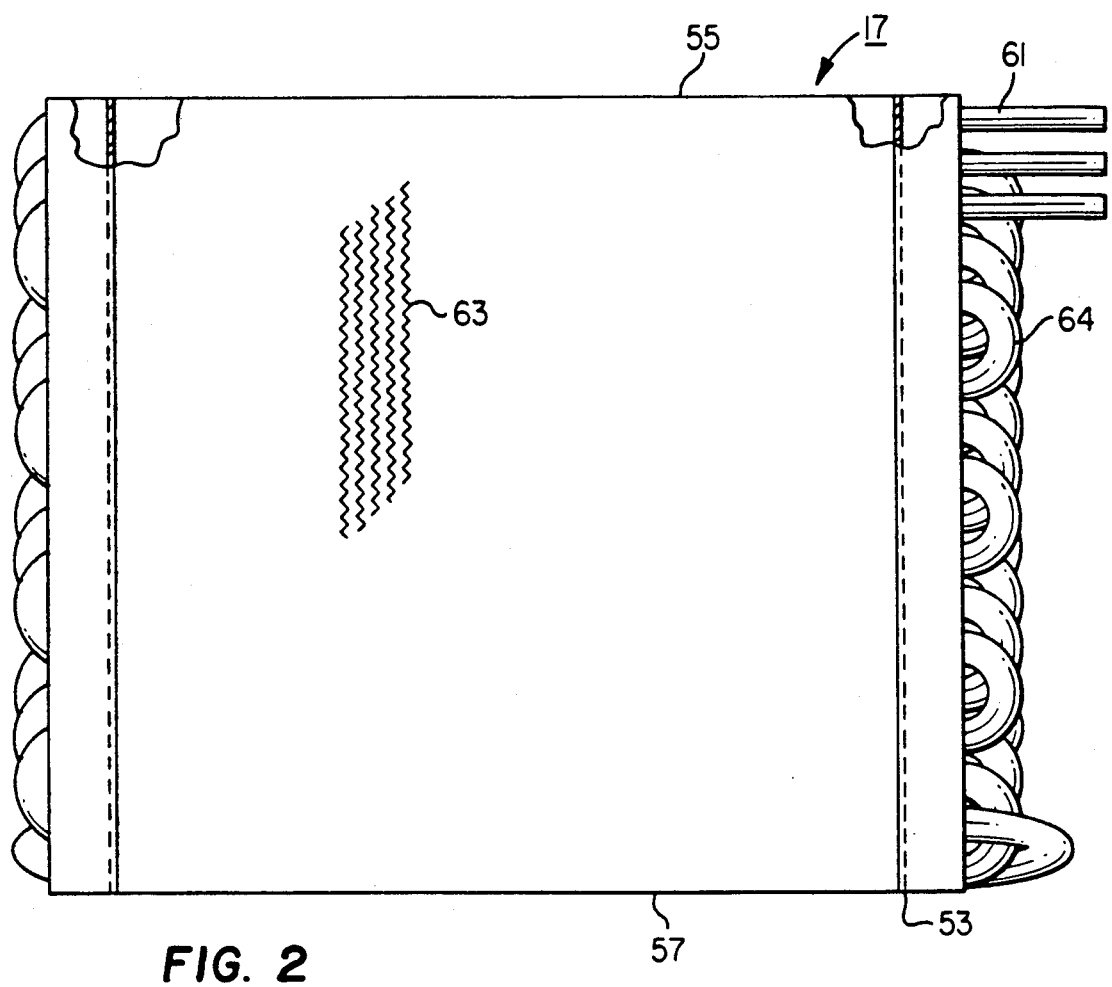
FIG. 2 is an enlarged front elevational view illustrating the heat exchanger used with the refrigerant recovery apparatus of FIG. 1.
Figure 3:
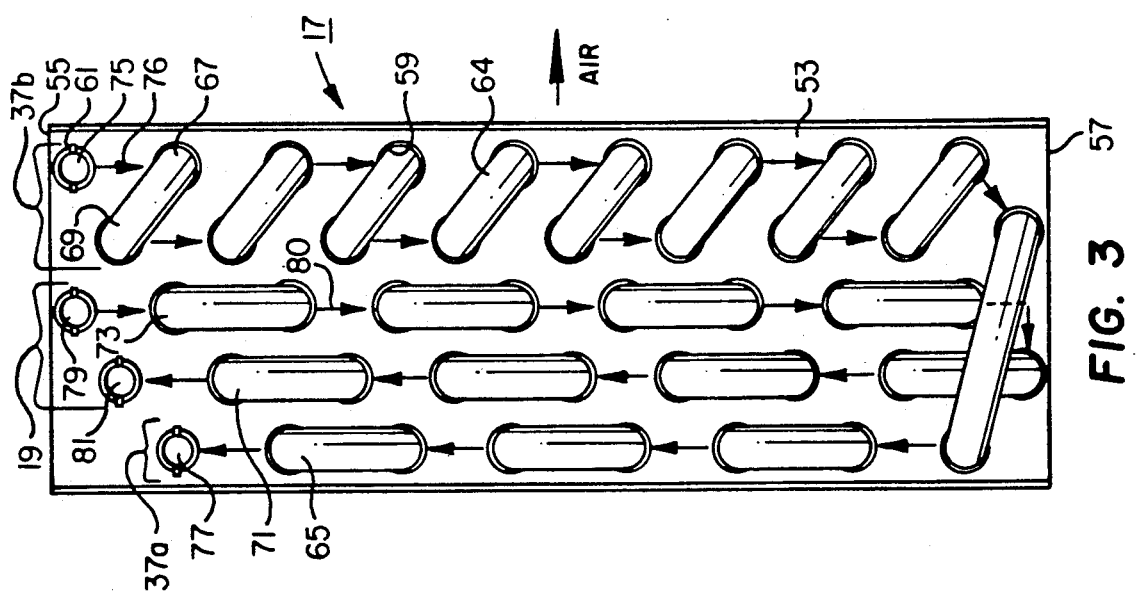
FIG. 3 is a side elevational view of the heat exchanger of FIG. 2.

The refrigerant gas leaving the expansion valve 15 passes to a heat exchanger 17. Heat exchanger 17 is shown schematically in FIG. 1, while FIGS. 2 and 3 show heat exchanger 17 in detail. Heat exchanger 17 has evaporator 19. The evaporator 19 will work conventionally, adding heat to the refrigerant. The refrigerant flows from evaporator 19 to a check valve 21, then to a strainer 23.

Strainer 23 removes impurities. The refrigerant flows to an accumulator 25, which will collect oil that has been recovered from the air conditioning system. Also, if any liquid refrigerant is still present, it would boil off in accumulator 25. The oil can be drained from accumulator 25 by means of a drain 27. A heater element 29 serves to prevent the temperature from dropping below a selected level in the accumulator 25.

The refrigerant flows from accumulator 25 to a compressor 31. Compressor 31 compresses the refrigerant, and in doing so adds heat to the refrigerant. The output of compressor 31 leads to an oil separator 33. Oil separator 33 collects lubricating oil discharged from compressor 31 and returns it to compressor 31 by means of a refill line 35. A heater 34 prevents the temperature of the oil separator 33 from dropping below a minimum level.

The gaseous refrigerant flows from oil separator 33 back to the heat exchanger 17. The refrigerant will flow to a condenser portion of heat exchanger 17. The condenser portion has a forward condenser section 37a and a rearward condenser section 37b. The refrigerant flows through the forward condenser section 37a, then through the rearward condenser section 37b.

A fan 39 forces air to flow across the heat exchanger 17. The air first flows through the forward condenser section 37a, then through the evaporator 19, and then through the rearward condenser section 37b. The air adds heat to the evaporator 19 to enhance evaporation of the refrigerant and prevent icing of water condensate on the evaporator 19. The air cools the coils of the condenser sections 37a, 37b.

The refrigerant flows through a line having a conventional moisture indicator 41 and into a storage container 43. The refrigerant will be a liquid at this point. A solenoid valve 45 allows refrigerant to be removed from storage container 43 and recycled for further cleaning. The solenoid valve 45 allows the refrigerant to flow to a filter drier 47 which removes moisture and other impurities. The refrigerant flows out the drier 47 and through a check valve 49. From the check valve 49, the refrigerant will flow back through the evaporator 19, filter 23, accumulator 25, compressor 31, oil separator 33, condenser sections 37a, 37b, and back into the storage container 43. A pressure relief valve 51 is located in bypass line around the filter drier 47.

FIG. 2 illustrates a front view of the heat exchanger 17. The evaporator 19 and condenser sections 37a, 37b of FIG. 1 are integrally contained in the heat exchanger 17. Heat exchanger 17 has a pair of headers 53. Headers 53 comprise flat metal plates, each located parallel to each other and spaced apart from each other. Headers 53 have upper ends 55 and lower ends 57. Each header 53 has a plurality of holes 59, illustrated in FIG. 3, which extend in vertical rows. Tubes 61 extend through the holes 59, each tube 61 having an end protruding past each header 53. Tubes 61 are parallel to each other and perpendicular to headers 53.

The tubes 61 extend through a plurality of fins 63. The fins 63 enhance heat exchange. Manifolds comprising U shaped joints 64 are located at each header 53. Each joint 64 joins the end of one of the tubes 61 to another of the tubes 61. The connection of each joint 64 determines the flow paths of the refrigerant through the heat exchanger 17.

Referring to FIG. 3, the headers 53 are arranged with a forward row of holes 59 that are vertically aligned with each other near the forward edge of header 53 to define a forward condenser row 65. The forward condenser row 65 makes up the forward condenser section 37a. There is also a vertical rearward condenser row 67 located at the rearward edge of the headers 53. An intermediate condenser row 69 locates directly in front of the rearward condenser row 67.

A forward evaporator row 71 locates immediately rearward of the forward condenser row 65. A rearward evaporator row 73 locates directly in front of the intermediate condenser row 69. All of the rows 65, 67, 69, 71, and 73 contain tubes 61 (FIG. 2) that are parallel to each other and perpendicular to the headers 53.

The condenser 37b has an input 75 which receives the discharge from the compressor 31 (FIG. 1). Input 75 locates at the upper end of the rearward condenser row 67. Input 75 and the joints 64 are arranged to direct the refrigerant as indicated by the arrows 76. The refrigerant flows from the upper tube of the rearward condenser row 67 to the upper tube of the intermediate condenser row 69, then to the next lower tube of the rearward condenser row 67 and so forth. The lowest tube of the rearward condenser row 67 leads to the lowest row of the forward condenser row 65. The refrigerant then flows upward through the tubes of the forward condenser row 65. This provides a serpentine flow path for the condensed refrigerant. The output 77 leads to the storage container 43 (FIG. 1).

The evaporator input 79 connects to the expansion valve 15 (FIG. 1). The evaporator input 79 is located at the top of the rearward evaporator row 73. As indicated by arrows 80, the refrigerant flows in a serpentine path down the rearward evaporator row 73, then back up the forward evaporator row 71. The evaporator output 81 is located at the upper end of the forward evaporator row 71. Evaporator output 81 leads to the check valve 21 (FIG. 1).

In the operation of the embodiment of FIG. 1, the input connection 11 connects to the air conditioning system. Similarly, the input connection 12 may connect to the air conditioning system, but at a point where only refrigerant gas will be removed. Refrigerant will flow from the input connection 11 through the expansion valve 15, which expands the liquid to a refrigerant gas which will be colder. The evaporator 19 will warm the gas to some extent, which then flows through the strainer 23 and accumulator 25 to the compressor 31.

The compressor 31 compresses the gas to a higher pressure. The gas will flow from compressor 31 through the condenser sections 37a, 37b. The fan 39 will remove heat created by the hot refrigerant gas in the condenser sections 37a and 37b. The refrigerant will flow as a liquid from the condenser section 37b into the storage container 43. The refrigerant may be recycled a number of times for cleaning. During the recycling, the refrigerant flows through the filter drier 47 and back through the apparatus in a manner as described.

The cold gas in the evaporator 19 tends to cause water condensate to form on the tubes of the evaporator 19. The air flowing across the condenser section 37a will be warmed by the condenser section 37a and will evaporate the water condensate as the air flows through the evaporator 19.

Figure 4:
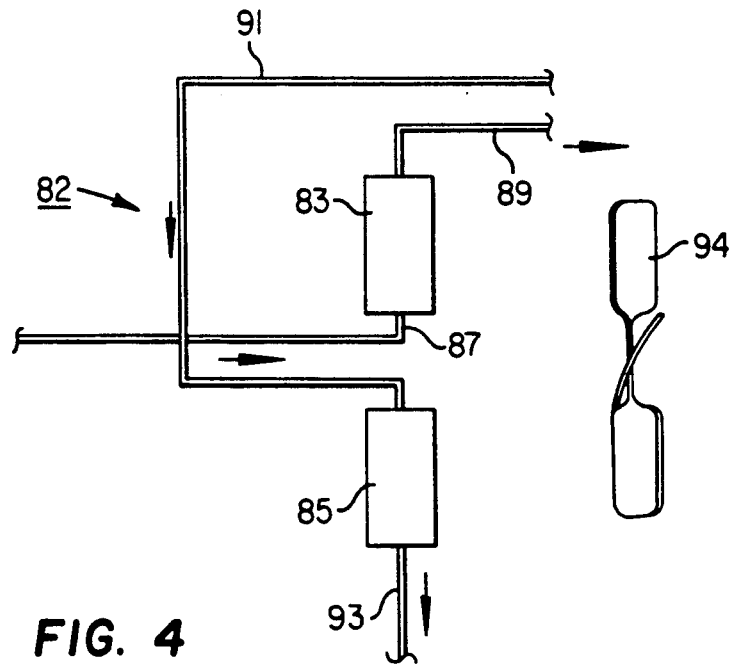
FIG. 4 is a schematic elevational view illustrating a second embodiment of a heat exchanger for use with the refrigerant recovery apparatus of FIG. 1.
Figure 5:
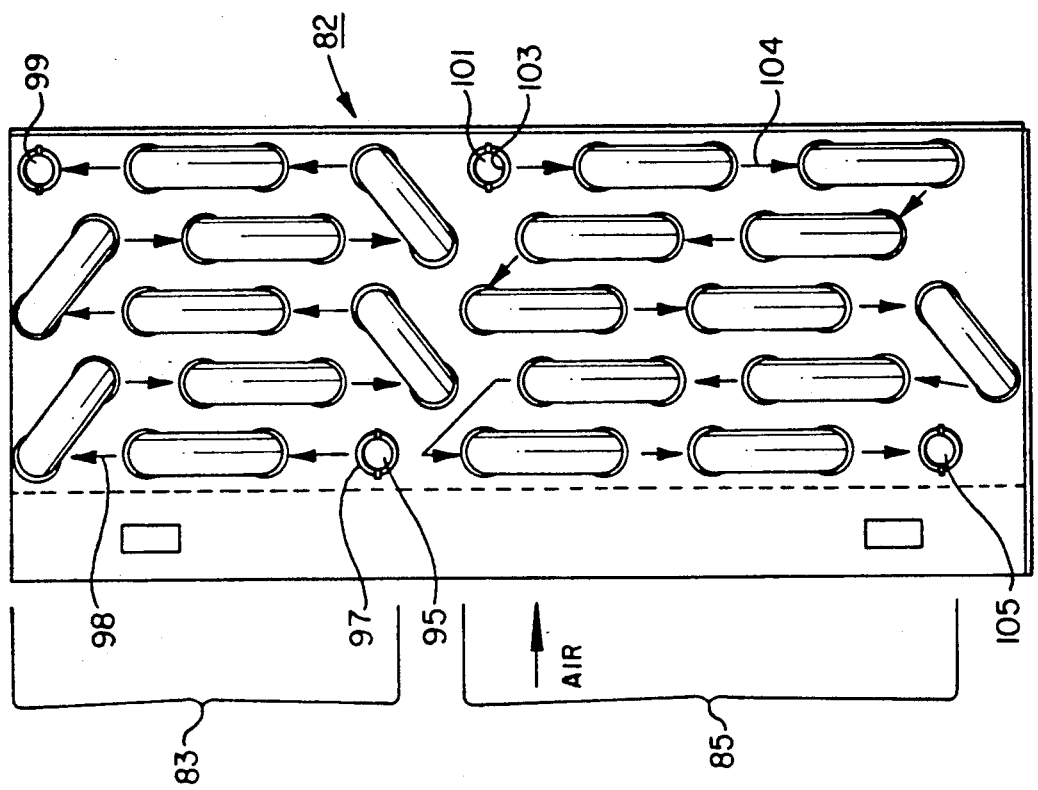
FIG. 5 is a side view of the heat exchanger of FIG. 4.

FIGS. 4 and 5 illustrate an alternate embodiment for the heat exchanger 17 of FIG. 1. Heat exchanger 82 has the same structure as the heat exchanger 17, but the joints 64 (FIG. 3) are connected in different manners to provide different flow paths. In this embodiment, heat exchanger 82 is made up of two sections 83 and 85. The section 83 is an evaporator, while the section 85 is a condenser. Evaporator 83 locates directly above the condenser 85. Any water condensate forming on the evaporator 83 will drip down onto the condenser 85.

Fan 94 blows across both of the sections 83, 85 of heat exchanger 82. FIG. 5 illustrates details of the connection of the tubes of the heat exchanger 82. The evaporator input 95 connects refrigerant to the evaporator tubes 97. The arrows 98 indicate the flow path. The flow is serpentine through the evaporator tubes 97 from the forward side of heat exchanger 8 toward the rearward side of heat exchanger 82. The flow terminates at the rearward row with an evaporator outlet 99 located at the upper end of heat exchanger 82.

The condenser input 101 is located on the rearward side of heat exchanger 82 and at the upper end of the condenser 85. The condenser input 101 connects the condenser tubes 103 in a manner for serpentine flow as indicated by arrows 104. Refrigerant flows down the rearward side then up and down in a serpentine fashion, terminating at the condenser outlet 105. The condenser outlet 105 is located at the forward side of heat exchanger 82 and on the lower end.

In the embodiment of FIGS. 4 and 5, the refrigerant recovery apparatus will operate in the same manner as in the embodiment of FIGS. 1-3. Condensate forming on the exterior of the evaporator tubes 97, however, will drip downward. The condensate will drip down onto the condenser tubes 103, all of which are located below the evaporator tubes 97. The heat of the condenser tubes 103 will evaporate the water condensate.

The invention has significant advantages. The combination heat exchanger causes the water condensate to evaporate. This allows the apparatus to be made portable without the need for disposing of water collecting in the apparatus. The heat exchanger allows the use of an inexpensive and efficient finned tube exchanger for both the condenser and the evaporator. Only a single fan is required.

While the invention has been shown in only two of its forms, it should be apparent to those skilled in the art that it is not so limited, but is susceptible to various changes without departing from the scope of the invention.

I claim:

1. In a refrigerant recovery apparatus for recovering refrigerant from an air conditioning system and storing the refrigerant in a storage container, the apparatus having a compressor with an input for receiving refrigerant and an output for discharging compressed refrigerant, an improved heat exchanger, comprising in combination:

a pair of spaced apart headers, each of the headers having a plurality of holes;

a plurality of finned evaporator tubes and a plurality of finned condenser tubes, each of the evaporator tubes and condenser tubes extending parallel to each other and perpendicular to the headers, each of the evaporator tubes and condenser tubes having ends which extend through one of the holes in each of the headers;

evaporator input means for receiving refrigerant from the air conditioning system and communicating it with one of the evaporator tubes;

means at each header for communicating a portion of the ends of the evaporator tubes with each other for flowing refrigerant received from the evaporator input means through the evaporator tubes, the refrigerant flowing through the evaporator tubes tending to cause water condensation to form on the evaporator tubes;

evaporator output means for supplying refrigerant that has passed through the evaporator tubes to the input of the compressor;

condenser input means for receiving refrigerant from the output of the compressor and communicating it with one of the condenser tubes;

means at each header for communicating a portion of the ends of the condenser tubes with each other for flowing refrigerant received from the compressor through the condenser tubes, the refrigerant flowing through the condenser tubes heating the condenser tubes, the heat causing the water condensation from the evaporator tubes to evaporate;

condenser output means for supplying refrigerant that has passed through the condenser tubes to the storage container;

fan means mounted adjacent the heat exchanger for flowing air through the heat exchanger to flow across the evaporator tubes and condenser tubes; and wherein the heat exchanger has an upstream front and a downstream back; wherein a forward portion of the condenser tubes is located at the front of the heat exchanger;

a rearward portion of the condenser tubes is located at the back of the heat exchanger; and wherein at least a central portion of the evaporator tubes is located between the forward portion of the condenser tubes and the rearward portion of the condenser tubes.

2. In a refrigerant recovery apparatus for recovering refrigerant from an air conditioning system and storing the refrigerant in a storage container, the apparatus having a compressor with an input for receiving refrigerant and an output for discharging compressed refrigerant, an improved heat exchanger, comprising in combination:

a pair of spaced apart headers, each of the headers having a forward edge, a rearward edge, an upper end and a lower end;

a forward row of finned condenser tubes extending between the headers at the forward edge of the headers from the lower end to the upper end of the headers;

a rearward row of finned condenser tubes extending between the headers at the rearward edge of the headers from the lower end to the upper end of the headers;

at least one central row of evaporator tubes extending between the headers from the lower end to the upper end of the headers and disposed between the forward row and rearward row of condenser tubes;

each of the evaporator tubes and condenser tubes extending parallel to each other and perpendicular to the headers, each of the evaporator tubes and condenser tubes having ends which extend through holes provided in each of the headers;

evaporator input means for receiving refrigerant from the air conditioning system and communicating it with one of the evaporator tubes;

manifold means at each header for communicating a portion of the ends of the evaporator tubes with each other for flowing refrigerant received from the evaporator input means through the evaporator tubes, the refrigerant flowing through the evaporator tubes tending to cause water condensation to form on the evaporator tubes;

evaporator output means for supplying refrigerant that has passed through the evaporator tubes to the input of the compressor;

condenser input means for receiving refrigerant from the output of the compressor and communicating it with one of the condenser tubes;

manifold means at each header of the heat exchanger for communicating a portion of the ends of the condenser tubes with each other for flowing refrigerant received from the compressor through the condenser tubes, the refrigerant flowing through the condenser tubes heating the condenser tubes which causes the water condensation on the evaporator tubes to evaporate;

condenser output means for supplying refrigerant that has passed through the condenser tubes to the storage container; and fan means mounted adjacent the heat exchanger for flowing air through the heat exchanger to flow across the evaporator tubes and condenser tubes in a direction from the forward edge to the rearward edge of the headers.

3. The apparatus according to claim 2 wherein the manifold means for the condenser tubes and the manifold means for the evaporator tubes each comprises a plurality of tubular joints, each joint having one end connected to one of the ends of one of the tubes and another end connected to one of the ends of another of the tubes.

4. The apparatus according to claim 2 wherein each of the headers comprises a flat plate that is parallel to the other plate.

5. In a refrigerant recovery apparatus for recovering refrigerant from an air conditioning system and storing the refrigerant in a storage container, the apparatus having a compressor with an input for receiving refrigerant and an output for discharging compressed refrigerant, the improvement comprising in combination:

a pair of spaced apart headers, each of the headers having a plurality of holes;

a plurality of finned evaporator tubes and a plurality of finned condenser tubes, each of the evaporator tubes and condenser tubes extending parallel to each other and perpendicular to the headers, each of the evaporator tubes and condenser tubes having ends which extend through the holes in each of the headers;

evaporator input means for receiving refrigerant from the air conditioning system and communicating it with one of the evaporator tubes;

means at each header for communicating a portion of the ends of the evaporator tubes with each other for flowing refrigerant received from the evaporator input means through the evaporator tubes, the refrigerant flowing through the evaporator tubes tending to cause water condensation to form on the evaporator tubes;

evaporator output means for supplying refrigerant that has passed through the evaporator tubes to the input of the compressor;

condenser input means for receiving refrigerant from the output of the compressor and communicating it with one of the condenser tubes;

means at each header of the heat exchanger for communicating a portion of the ends of the condenser tubes with each other for flowing refrigerant received from the compressor through the condenser tubes, the refrigerant flowing through the condenser tubes heating the condenser tubes;

the evaporator tubes being located above the condenser tubes so that water condensation from the evaporator tubes will drip onto the condenser tubes, the heat causing the water condensation to evaporate;

condenser output means for supplying refrigerant that has passed through the condenser tubes to the storage container; and fan means mounted adjacent the heat exchanger for flowing air through the heat exchanger to flow across the evaporator tubes and condenser tubes.

6. The apparatus according to claim 5 wherein each of the headers is a flat plate.

7. The apparatus according to claim 5 wherein each of the headers is a flat plate parallel to the other plate.

* * * * *